Nov. 9, 1965 P. W. CURWEN 3,216,679
ACTIVE VIBRATION ISOLATOR
Filed Feb. 6, 1963 3 Sheets-Sheet 1

INVENTOR.
PETER W. CURWEN
BY
Walter F. Wessendorf Jr
Attorney

Nov. 9, 1965  P. W. CURWEN  3,216,679
ACTIVE VIBRATION ISOLATOR
Filed Feb. 6, 1963  3 Sheets-Sheet 2

INVENTOR.
PETER W. CURWEN
BY
Walter F. Wessendorf Jr.
Attorney

INVENTOR.
PETER W. CURWEN

United States Patent Office 3,216,679
Patented Nov. 9, 1965

3,216,679
ACTIVE VIBRATION ISOLATOR
Peter W. Curwen, Ballston, N.Y., assignor to Mechanical Technology Incorporated, Latham, N.Y., a corporation of New York
Filed Feb. 6, 1963, Ser. No. 256,676
4 Claims. (Cl. 248—20)

This invention relates to an active vibration isolator.

The problem in the art to which this invention pertains is the need for an isolating device (an isolator) which can isolate a mounted piece of equipment from objectionable dynamic foundation displacements; and/or which can isolate objectionable dynamic forces, which may be generated by the piece of equipment, from the supporting foundation. These dynamic foundation displacements and these generated dynamic forces have components which act in either a vertical direction or in a lateral direction, or which act in both a vertical and lateral direction.

The theory of vibration isolation teaches that good isolation of equipments can be achieved when the resonant vibration frequencies of the isolation system lie well below the frequencies of the objectionable dynamic forces and/or displacements which are to be isolated. The phrase "isolation system" as used herein will denote the combination of one or more isolators and the equipment supported by the isolators. The lower the resonant frequencies of the isolation system, relative to the objectionable frequencies, the better will be the degree of isolation which can be achieved.

Vibration theory also teaches that low resonant frequencies of the isolation system can be achieved by making the dynamic spring rates of the isolators low. The phrase "dynamic spring rates" as used herein refers to the effective force-deflection gradients exhibited by the isolators when subjected to small dynamic deflections having frequencies the same as the objectionable dynamic forces and/or displacements which are to be isolated.

This invention solves the problem of obtaining an isolator which will exhibit very low dynamic spring rates, and yet will not undergo large static deflections when loaded by the weight of the equipment to be isolated.

When passive isolators, such as mechanical springs or rubber pads, are used, the steady-state loading of the equipment to be isolated causes the isolator to statically deflect. If the spring rate of the isolator is low, which it must be if low frequency isolation is desired, the static deflection must necessarily be very large. This factor results in an unwieldly isolating unit from the design point of view because low spring rate and high load carrying ability of the isolating unit are by themselves conflicting requirements.

Therefore, the object of this invention is to provide an active vibration isolator which has a low dynamic spring rate and at the same time a high static spring rate. The isolator can then support heavy equipment weights with very small static deflection, but at the same time will be capable of very low frequency vibration isolation because of its low dynamic spring rate.

Another object of the invention is to provide a closed-loop feedback control system cooperatively associated with displacement, pickup and drive transducers whereby a provided source of external gas under pressure enters the unit, and acting within the unit, acts upon the displacement piston of the isolator to balance the equipment load on the piston and at the same time maintains a steady-state piston position. The closed-loop feedback control system senses the piston position through the co-operating displacement transducer and thereby provides a control signal to control the oscillation amplitude of a vibrating reed flow restrictor and thereby the pressure of the gas acting within the unit.

A still further object of the invention is to provide a vibrating reed flow restrictor that has a minimum of mechanical parts and a minimal function of the parts, a vibrating reed flow restrictor with system simplicity and high operation reliability, and a vibrating reed flow restrictor that has no mechanical contact with other elements of the isolator.

These and other objects of the invention should be appreciated from the detailed specification taken in conjunction with the drawings, wherein like reference numerals refer to similar parts throughout the several views, in which.

Figure 1:
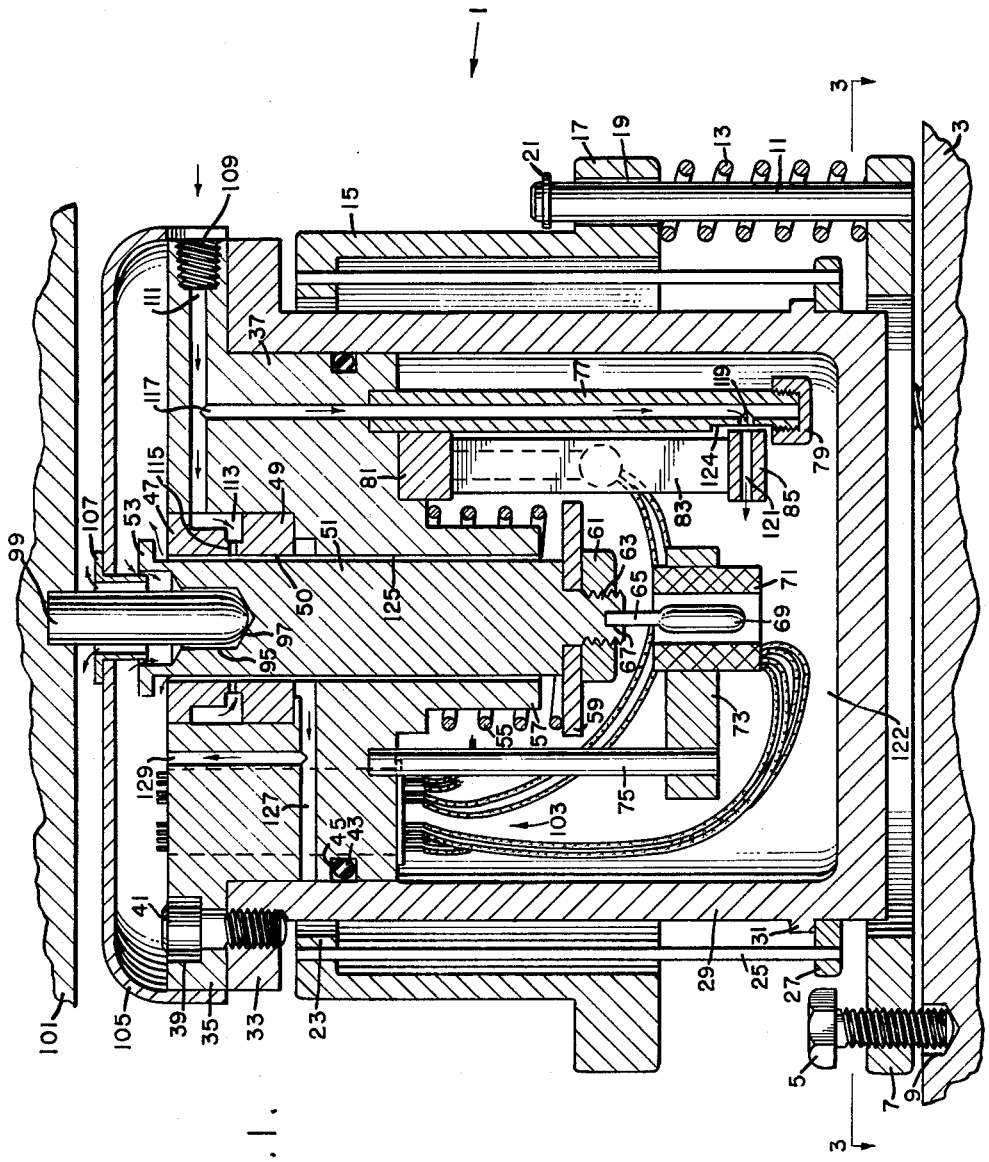
FIG. 1 is a sectional view of the isolator.
Figure 2:
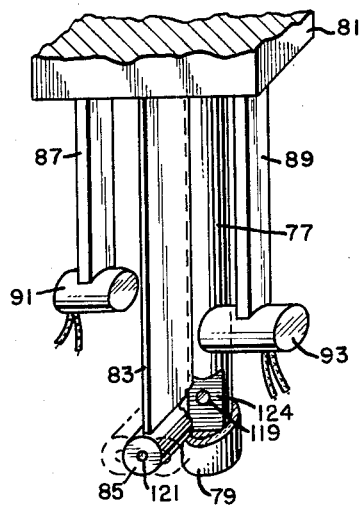
FIG. 2 is a perspective view of the vibrating reed flow restrictor assembly.
Figure 3:
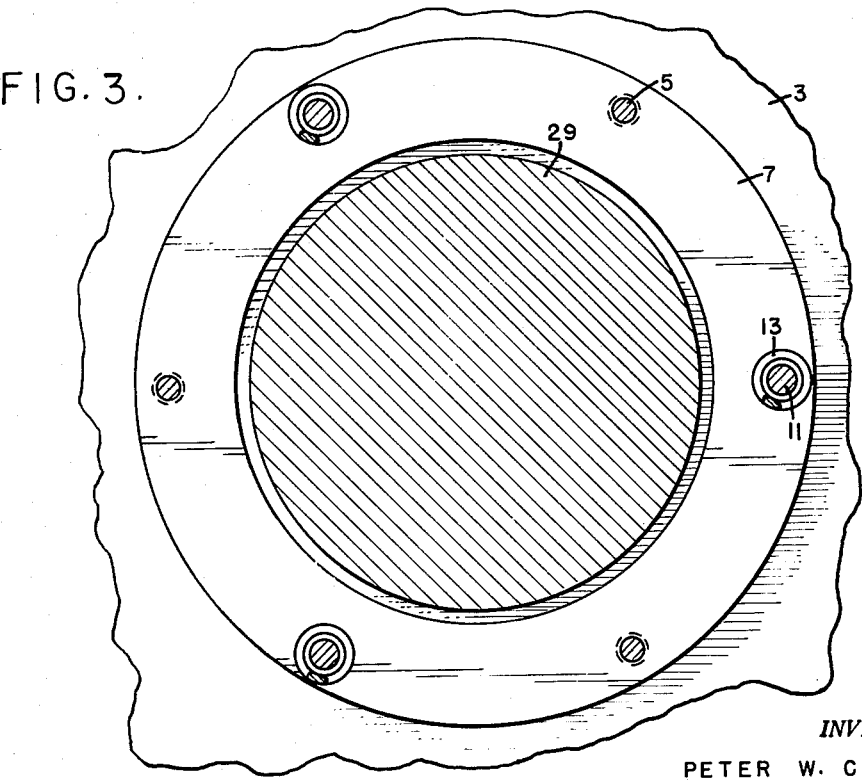
FIG. 3 is a sectional view taken along the line 3—3 of FIG. 1.

Reference numeral 1 generally refers to the invention. A ring bracket 7 is mounted to support structure 3 by three cap screws 5 engaging tapped holes therein. The equidistantly disposed screws 5 level the isolator assembly and for such purpose the screws 5 are freely received in holes drilled in the support structure 3.

Equidistantly disposed on ring bracket 7 and suitably secured therewith are three upstanding posts 11 with three preloaded springs 13 disposed on the posts 11. A cylindrically configured lateral spring housing 15 has an outwardly, laterally extending flange portion 17. Three bushings 19 formed in flange portion 17 receive the upstanding posts 11 therein with three snap rings 21 suitably secured to the ends of the posts 11 to act and function as limit stops and thereby prevent movement of the upper portion of flange portion 17 beyond the restricting snap rings 21. The lower portion of the flange portion 17 rests on the tops of the springs 13.

Suitably secured to the inwardly, laterally extending flange portion 23 are upper portions of vertically disposed lateral spring element rods 25 having their bottom portions suitably secured to a support ring 27. Support ring 27 is suitably secured, such as by press fit, to a pressure cylinder 29 with the upper portion of support ring 27 in abutting relationship with the lower portion of flange 31 which laterally extends outwardly from pressure cylinder 29.

The upper portion of pressure cylinder 29 has an outwardly, laterally extending flange portion 33 upon whose upper portion is seated a lateral flange 35 outwardly extending from cylinder head 37. Holes countersunk in flange portion 35 receive therein screws 41 which engage tapped holes of flange portion 33 thereby securing cylinder head 37 to pressure cylinder 29. A gas tight seal 43 is disposed within a peripheral groove 45 of cylinder head 37.

A lateral thrust gas bearing 47 is disposed and suitably secured within a complemental seat 49 formed in cylinder head 37. Cylinder wall 50 of bearing 47 reciprocably receives piston 51 and piston 51 has integral therewith a flange portion 53 which acts and functions as a limit stop in the downward travel of piston 51. Control spring 55 disposed on spring seat 57 formed on the bottom portion of cylinder head 37 has the bottom thereof engaged by thrust washer 59 that is received on the narrowed portion of piston 51. A nut 61 engaged with the threaded end portion 63 of piston 51 retains the spring assembly in place.

A core support 65 is received and suitably secured within a hole 67 formed in the threaded end portion 63.

Core support 65 carries core 69 of displacement transducer 71. Suitably secured to transducer 71 and laterally extending therefrom is transducer retainer 73. A support member 75 suitably secured to cylinder head 37, and depending therefrom, is likewise suitably secured to retainer 73 and upstanding therefrom.

Suitably secured to cylinder head 37 is a communicating pipe 77 having a cap 79 engaged on the end thereof. A reed base 81 suitably secured to cylinder head 37 has a reed 83 depending therefrom and in alignment with vertically disposed pipe 77. Secured on the end of reed 83 is a flow restrictor 85. Secured to reed base 81 and depending therefrom on each side of reed 83 are support members 87 and 89 carrying, respectively, pickup transducer 91 and drive transducer 93.

Mounted freely in the concentric hole 95 formed in the top portion of piston 51 and having formed in the bottom of hole 95 a mounting point 97, is a vertically disposed mounting pin 99 which carries the equipment bracket or support structure 101 for the external heavy equipment.

Adjacent the upper portion of support member 75 is shown a conventional ceramic pressure type connection which is generally referred to herein by reference numeral 103, inclusive of which reference are the wires which lead to and connect with the transducers 71, 91 and 93. A top cover 105 encloses the upper portion of the isolator with a dirt shield 107 appropriately disposed on cover 105, as shown.

A gas inlet 109 for connection with a fitting of an external gas line communicates with port 111 which in turn communicates with chamber 113 of bearing 47 and with restricted orifices 115. Restricted orifices 115 communicate with the restricted space formed by the cylinder wall 50 and the periphery of the piston 51, such restricted space thereby providing a hydrostatic functioning gas bearing for the piston 51.

The bight portion of port 111 communicates with port 117 disposed normal to port 111. Port 117 further communicates with pipe 77 which has a restricted orifice 119 normally disposed therewith. When in alignment with orifice 119, orifice 121 of reciprocating flow restrictor 85 communicates with orifice 119 and permits exit of gas under pressure from orifice 119 and into the chamber 122 of pressure cylinder 29. It should be noted that the reciprocating flow restrictor 85 makes no mechanical contact with any element of the isolator inasmuch as a suitable cut out portion 124 is provided in pipe 77 to thereby provide sufficient clearance between restrictor 85 and pipe 77.

Gas which exits from orifice 121 upon alignment of same with orifice 119 will build up the pressure in chamber 122 of pressure cylinder 29 and buoy piston 51 upwardly against the dead weight load of the mounted equipment and the force of spring 55. The restricted space formed between cylinder wall 125 of the cylinder head 37 and the periphery of piston 51 further functions as a hydrostatic gas bearing for the lower part of piston 51. Pressure venting from the restricted space in the lower part of piston 51 is permitted by chamber 127 through port 129 which communicates with the atmosphere in the gas flow directions shown by the arrows.

Figure 4:
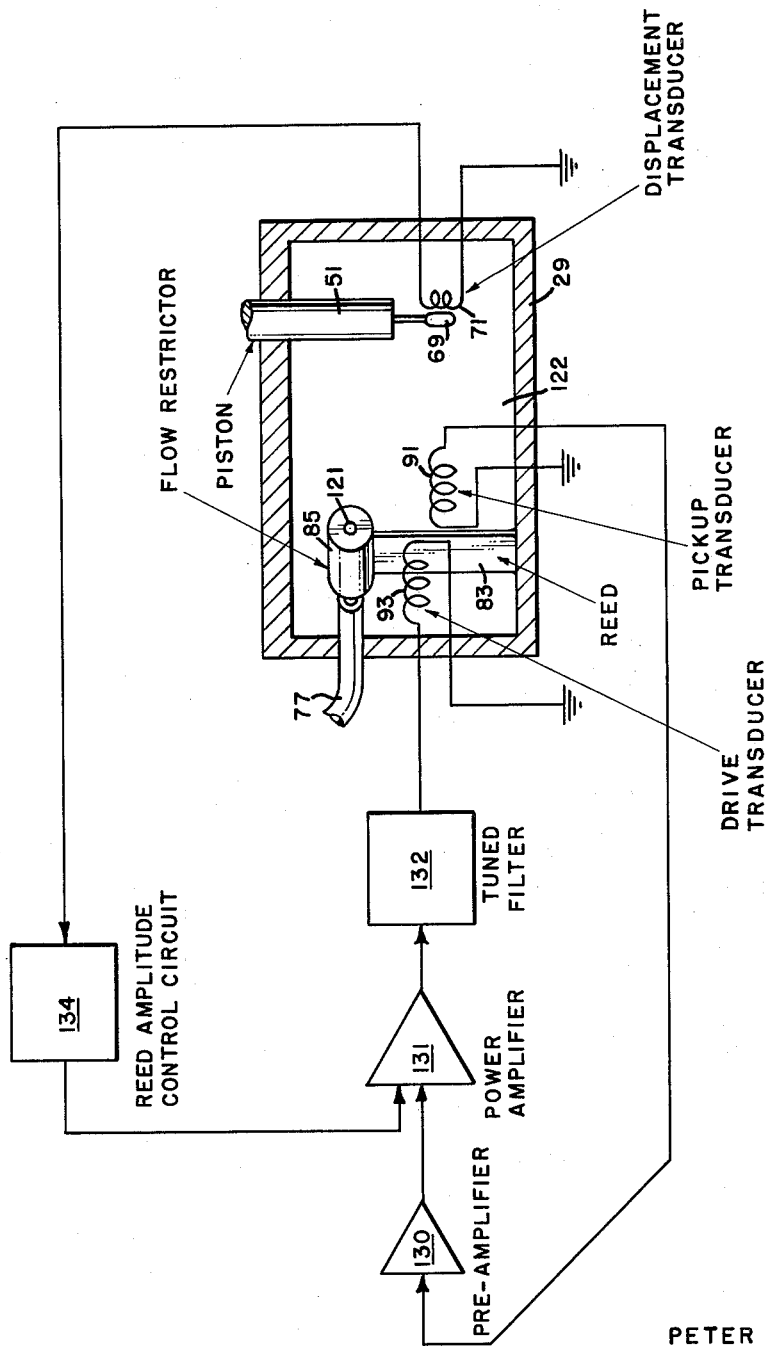
FIG. 4 is a diagram of the closed-loop feedback control system of the invention.

In FIG. 4 is shown the diagram for the closed-loop feedback control system. Either conventional or specially designed electronic circuits may be utilized with the embodiment of the invention described and shown, so long as the operative function described below is obtained; the electronic circuits may utilize either vacuum tube or solid-state circuit elements. The solenoid or drive transducer 93 is connected to the tuned filter circuit 132. The tuned filter circuit 132 is designed to have approximately the same resonant frequency as the assembly of reed 83 and flow restrictor 85. Electrical power is supplied to the tuned filter circuit 132 and to the drive transducer 93 by the power amplifier 131. The electrical signal from the feedback pickup transducer 91, which detects the motion of the reed, is amplified by the preamplifier 130. The reed 83 and flow restrictor 85 assembly, the drive transducer 93 and pickup transducer 91, and the drive circuit components 130, 131 and 132 are thus connected in a closed-loop feedback oscillator configuration. When the voltage gain of pre-amplifier 130 is adjusted to a sufficiently high value, self-oscillation of this electomechanical system begins and the reed undergoes a reciprocating motion at the resonant frequency of the electromechanical system. The resonant frequency of this closed-loop electromechanical system is essentially the same as the fundamental resonant frequency of the reed 83 and flow restrictor 85 assembly.

The amplitude of the reciprocating motion of the flow restrictor 85 governs the gas flow through the restricted orifice 119, which gas flow in turn determines the gas pressure in chamber 122 and ultimately the position of piston 51. The position of piston 51 is detected by the displacement transducer 71. The electrical signad from displacement transducer 71 feeds into the reed amplitude control circuit 134. The displacement transducer signal is compared to a reference signal in the control circuit 134 and thusly generates a piston 51 position error signal. If the piston 51 position error signal is other than zero, a correction signal is applied by the reed amplitude control circuit 134 to the power amplifier 131 which changes the effective gain characteristic of the power amplifier. This results in a change in the amplitude of the reciprocating motion of the flow restrictor 85 such that the flow of gas into chamber 122 is correctly altered so as to maintain piston 51 at its proper position.

A heavy airborne camera mounted in the airplane would lend itself to the improvements accomplished by this invention. The objective in this case would be to isolate airframe vibrations from the camera so that the camera resolution would not be impaired. The dead weight of the camera would initially be distributed over several isolators by proper pre-adjustment of cap screws 5. Preload springs 13 allow the weight distribution between isolators to be accurately preset.

In the operation of this three-axis, low stiffness isolator, the dead weight loading of the camera is transmitted to the airplane structure through springs 13 which have a high spring rate and hence undergo small deflections. The gas supply is turned on and the gas entering the chamber 122 builds up in pressure to the point where the load of the camera on the piston 51 is balanced by the pressure loading of the gas in chamber 122 acting upwardly on piston 51 against the downwardly exerted force of the compression control spring 55.

Increase of the gas pressure in chamber 122 will cause the piston 51 to move upwardly against the downwardly exerting force of spring 55. Piston 51 is maintained in a steady state position by the closed-loop feedback position control system which senses the positional displacements of the piston 51 through the displacement transducer 71. The displacement signal is compared to a reference signal and the resulting error signal controls the oscillation amplitude of the vibrating reed 83 thereby controlling the gas flow rate into the chamber 122 of pressure cylinder 29.

For purposes of further operational explanation, displacement of piston 51 displaces core 69 within transducer 71 which feeds back the displacement signal directly to the input of the control system which affects the drive signal to the drive transducer 93 which effects the reciprocation of reed 83 that is self-starting and self-driving. The excitation of the reed system causes a voltage to be generated in the pickup transducer 91. This generated electrical signal is fed back by the feedback path of the closed-loop reed drive system.

Having thusly described my invention, I claim:

1. An active vibration isolator comprising a pressure cylinder, a vertically displaceable piston disposed within a second cylinder secured to the pressure cylinder, means on said piston for receiving a load, said piston being subjected to vertical displacements in response to said load, and automatic control means responsive to said vertical piston displacements for applying a vertical force to said piston to return and maintain said piston in a predetermined position; said control means comprising a transducer sensitive to piston displacement and capable of generating a voltage when the piston is displaced vertically, means connected with said transducer for comparing said voltage with a comparative voltage for producing an error signal in proportion to the amount of piston displacement, means transmitting said error signal to a drive transducer, means associating said drive transducer with a valve for controlling the same and arranged to control the supply of gas into the space defined by said pressure cylinder and said second cylinder and in an amount to move said piston to its original position.

2. An active vibration isolator as defined in claim 1 further comprising a plurality of vertically disposed spring rods suspending said pressure cylinder from a foundation.

3. An active vibration isolator as defined in claim 2 wherein said means for accommodating said load comprises a lateral thrust gas bearing for said piston.

4. An active vibration isolator as defined in claim 1, further comprising a control spring associated with said cylinder for biasing said piston downwardly.

References Cited by the Examiner

UNITED STATES PATENTS

| | | | |
|---|---|---|---|
| 2,706,607 | 4/55 | Withers | 248—22 |
| 2,964,272 | 12/60 | Olson | 248—19 |
| 3,037,585 | 6/62 | Williams | 248—358 |
| 3,081,552 | 3/63 | Reason | 248—358 X |
| 3,088,062 | 4/63 | Hudimac | 248—358 X |

CLAUDE A. LE ROY, *Primary Examiner.*

FRANK L. ABBOTT, *Examiner.*